United States Patent [19]

Nagle et al.

[11] 4,383,045
[45] May 10, 1983

[54] MAGNESIA REFRACTORIES BONDED WITH SULFAMIC ACID

[75] Inventors: Dennis C. Nagle, Catonsville, Md.; Myron T. McCall, Charlotte, N.C.; In H. Kim, Sykesville, Md.

[73] Assignee: Martin Marietta Corp., Bethesda, Md.

[21] Appl. No.: 372,413

[22] Filed: Apr. 27, 1982

[51] Int. Cl.³ .............................................. C04B 35/04
[52] U.S. Cl. ..................................... 501/109; 501/110; 501/116; 501/117; 501/121; 501/123; 106/121
[58] Field of Search ............... 501/108, 109, 110, 117, 501/116, 121, 123; 106/121

[56] References Cited

U.S. PATENT DOCUMENTS 3,030,217  4/1962  Chantler et al. .................... 501/110
4,169,734  10/1979  Brezny ................................. 501/116

FOREIGN PATENT DOCUMENTS 1086216  10/1967  United Kingdom ................ 501/110

Primary Examiner—James Poer
Attorney, Agent, or Firm—Herbert W. Mylius; Gay Chin

[57] ABSTRACT

Gunning mixes and other magnesia-based refractory compositions are disclosed which include up about to 10% by weight sulfamic acid as a binder. Sulfamic acid reacts readily with periclase grain and, when employed with boric acid and ceramic sintering aids forms an excellent binder system.

14 Claims, No Drawings

MAGNESIA REFRACTORIES BONDED WITH SULFAMIC ACID

TECHNICAL FIELD

This invention relates to refractory compositions. More particularly, it relates to magnesia-based refractory compositions useful in maintenance gunning of metallurgical vessels, in ramming mixes, in castable refractories, and in basic refractory brick. Most particularly, it relates to refractory materials, especially gunning mixes, which are chemically adhered by means of a new novel binder.

BACKGROUND ART

In the production of steel, the refractory brick linings of conventional process vessels generally wear unevenly due to hot spots, slag attack, or other operating parameters. In order to extend the useful life of such linings, it has become accepted practice to repair excessively worn areas between heats by means of gunning granular refractory materials onto the brick surfaces. That is, a dry mixture including granular refractory grain is pneumatically delivered to the nozzle of a spray gun where it is mixed with water, resulting in a cohesive plastic mass which is projected against the irregularly worn surface, thereby filling in or patching the defective areas. Under the usual circumstances, gunning is initiated within minutes after the molten steel is tapped from the hot vessel. When properly constituted and emplaced, the gunning mix is a relatively stiff plastic mass which adheres to the hot vessel lining and which quickly converts to a relatively hard non-plastic state during the cooling cycle of the furnace. As the temperature of the furnace rises during the next heat, components of the mixture sinter to more permanently bond the refractory gains to themselves and to the brick lining.

The granular refractory material used in gunning mixes is usually composed of a magnesia having a periclase crystalline phase. Such materials include dead burned natural magnesite and a synthetic periclase product derived from seawater or brine. Because of their comparatively lower cost in the market, dead burned dolomite and/or chrom ore grog, along with magnesite in different combinations, have also been conventionally employed as refractory materials in gunning mixes. But due to the lack of any cohesiveness when wetted with water, such refractories must additionally include a binder to provide at least temporary strength to the mass at low temperatures, i.e., prior to subjecting the mass to sintering temperatures. Optionally, a clay mineral is also included in the mixture as a gelling or plasticizing agent.

Both organic and inorganic binders have been suggested for use in gunning mixes. Representative organic binders have included starch, dextrin, various organic sulfonic acids and salts, and tars, pitches and resins, but all of these binders suffer a variety of drawbacks which render them detrimental for use in gunning mixes. For example, refractory mixes containing organic sulfonic acids as a low temperature binder have been found to ignite and burn when applied between heats to the refractory brick lining of a hot (1200° C.) metallurgical vessel, thereby eliminating these materials from consideration as additives for that purpose. For the most part, organic additives contribute excessive porosity to the emplaced material which diminish their refractoriness, durability and strength.

Inorganic binders pose some of the same and some different problems when employed in gunning mixes. For example, sulfuric acid is an excellent binder for magnesia-based refractory materials, reacting very quickly with the MgO content of the mixture to form a strong chemical bond. However, since sulfuric acid is available only in liquid form, it is incapable of being pre-mixed directly with the refractory grain of the gunning mix for ultimate use in conventional maintenance gunning equipment. For this reason, solid inorganic binders capable of being dissolved or dispersed in water have been in common use in gunning mixes, and typical of these are chromic acid, sodium silicate, phosphate glasses, Epsom Salt, and magnesium chloride. As with the organic additives, most of these binding agents suffer one or more disadvantages such as slowness of reaction or air setting, lack of strength at intermediate temperatures, poor slag resistance, etc.

Chromic acid flake is generally accepted to be the best currently available material for bonding periclase grain, due particularly to the mechanical strength, slag resistance, and durability of the resultant products. In gunning mixes, the use of anhydrous chromic acid has been especially beneficial because of the fact that it is a dry solid material which can be pre-mixed with the refractory aggregate conventionally employed in gunning mixes, because it solubilizes rapidly in water when mixed at the nozzle of a conventional gunning device, and because it reacts very quickly with the MgO content of the gunning mix at it is emplaced on the refractory lining surface forming a strong, low temperature bond. Moreover, when the temperature of the process vessel is raised to operating temperatures, the chromic acid residue is totally dispersed throughout the refractory system and aids in the sintering of the refractory grain.

Recently, however, hexavalent chromium has been identified as a potential carcinogen so that the use of anhydrous chromic acid, $CrO_3$, in the refractory industry has come under close scrutiny. It is, therefore, an object of this invention to provide a dry, solid hexavalent chromium-free binder system for use with magnesia-based refractory mixes, particularly gunning mixes for the repair of metallurgical vessels.

DISCLOSURE OF INVENTION

The objective of the instant invention has been achieved by the discovery that sulfamic acid is capable of reacting very quickly with periclase grain within a wide range of temperatures resulting in a strong chemical bond particularly suitable for maintenance gunning of steelmaking vessels. Moreover, it has been discovered that the use of sulfamic acid as a binder finds wide applicability in the refractories industry, such as in the manufacture of castables, ramming mixes, burned or unburned refractory bricks, and even in trowelable refractory coating mixes. Thus, while the following description is particularly directed to gunning mixes and the use of sulfamic acid in such mixes, it is not intended that the invention herein be construed as limited exclusively to such gunning mixes but rather be viewed in the broadest sense as applicable to any refractory requirement calling for a strong chemical bond.

BEST MODE FOR CARRYING OUT THE INVENTION

Sulfamic acid, $NH_2SO_3H$, is a dry, nonvolatile, white crystalline solid which has outstanding chemical stability when dry and may be stored for years without change. While the acid is only moderately soluble in water, in aqueous solution it is highly ionized and strongly acidic, equivalent in acid strength to hydrochloric and nitric acids. At 25° C. the pH of a 1% solution is 1.18, a value comparatively lower than the pHs for formic, phosphoric, and oxalic acids. Therefore, it reacts very rapidly with a base such as MgO. Moreover, sulfamic acid presents no fire or explosion hazard, evolves no fumes, and its action in dry crystalline form on the skin is limited to the effects of low pH.

The chemical stability of dry sulfamic acid and the high reactivity of its aqueous solutions with MgO at temperatures ranging from room temperature to those in excess of 1000° C. make it an ideal candidate for use in refractory gunning mixes where the refractory material is mixed with water at the nozzle of the pneumatic gun and is almost simultaneously applied to the cooling vessel lining. The plastic mass hardens in very short order, probably resulting in the formation of a magnesium sulfate cement. The sulfamate bond is totally dispersed throughout the refractory emplacement and is extremely stable at temperatures from ambient temperatures up to about 1200° or 1300° C. and higher.

For almost any kind of refractory composition, the amount of sulfamic acid binder may vary from about 0.5% to 10% by weight, although little advantage is realized in most circumstances by adding more than about 5% by weight. Preferably, the sulfamic acid is present in amounts within the range of from about 1.5% to about 3% by weight.

In order to maintain the physical properties of the gunned refractory as the temperature of the furnace rises, boric acid may be added to the refractory mix in concentrations of from about 0.25 to about 5% by weight with from about 0.5% to about 1.5% being optimal. The boric acid component of such a mix becomes a very viscous, glass-like liquid within the temperature range of about 500° to 1300° C., thereby allowing the refractory grains to densify. It is even thought that boric acid might enter into the magnesia-sulfamic acid reaction system to improve the intermediate temperature (800° to 1200° C.) physical properties of the gunned structure. Be that as it may, the performance of the gunning mixes according to this invention containing the boric acid addition are far superior to any which do not contain it.

Ceramic sintering aids may also be employed in the refractory mixes of the present invention to enhance the mechanical and chemical properties of the gunned products at or near steelmaking temperatures. At these temperatures, the sintering aids react with periclase grain to form a bond between adjacent grains. Sintering aids in this category include, for example, $Cr_2O_3$, $Ca(NO_3)_2$, $Fe_2O_3$, $Al_2O_3$, bauxite, $TiO_2$, and chrome ore, as well as mixtures of two or more of the same. $Cr_2O_3$ and $Ca(NO_3)_2$ are preferred for addition to a refractory mix according to the present invention, and $Fe_2O_3$ and $Al_2O_3$ are almost always found as impurities in magnesias. In total, such sintering aids can be employed in concentrations ranging from about 0.25 to about 10% by weight with about 0.5 to about 1.5% being optimal.

The refractory aggregate preferred for the practice of the present invention is a calcined or dead burned synthetic or natural magnesia product composed of 98% crystalline phase periclase (MgO). A typical chemical analysis of such a magnesia is as follows.

| Material | Percent |
|---|---|
| $SiO_2$ | 0.6 |
| $Al_2O_3$ | 0.2 |
| $Fe_2O_3$ | 0.2 |
| CaO | 0.9 |
| MgO | 98.1 |

Higher and lower grades of magnesia refractory grain may also be used having an MgO content ranging from about 50 to about 99.5% by weight with the balance being incidental impurities. Thus, for example, a 98% MgO aggregate, derived from seawater, may be used as the sole refractory component of the mix or may be combined with other refractory materials such as lower grade periclase products derived from seawater, such as an 88% MgO, a low flux dead burned dolomite, and chrome ore, all of which materials contain appreciable weight percentages of MgO.

When selecting a refractory aggregate for maintenance gunning operations, the screen sizing of the particles is an important consideration. Allowances should be taken into account for such factors as the packing characteristics of the refractory components and for the size limitations of the gunning equipment. For conventional gravity flow equipment, refractory aggregate sized according to Table 1 has been found to be most suitable.

TABLE 1

| U.S. Seive Series | Range in Percent by Weight |
|---|---|
| +4 mesh | 0–2 |
| 4 × 6 mesh | 3–11 |
| 6 × 8 mesh | 4–11 |
| 8 × 16 mesh | 16–28 |
| 16 × 30 mesh | 15–25 |
| 30 × 50 mesh | 4–12 |
| 50 × 100 mesh | 3–9 |
| −100 mesh | 26–34 |

For other gunning equipment, such as the positive feed, compartmentalized machines used in Japan, finer screen sizings may be used, such as −30 or −40 mesh. It is not inconceivable, however, that such equipment can adequately feed −100 mesh material exclusively.

The screen sizings for refractory mixes intended for different purposes can vary widely. Generally, however, the size of aggregate particles for castable and ramming mixes is coarser than that for gunning mixes. For basic refractory brick mixes, the screen sizings are even coarser and often include particle sizes of one inch or greater, while for refractory coating mixes, the finest-grained aggregates are the standard. The binder and water requirements for this variety of refractory mixes also vary widely and depend generally on such factors as the screen sizing of the refractory component, the nature of the additives employed, and the intended use of the mix. For example, the amount of water added to the refractory mix may range between 2–3% for basic brick to 10–12% and beyond for gunning and coating mixes.

A series of dry, granular refractory mixtures suitable for use in maintenance gunning of steelmaking furnace linings were prepared from a dead burned synthetic magnesite having a screen analysis according to Table 2 as follows:

TABLE 1

| U.S. Seive Series | Range in Percent by Weight |
|---|---|
| +4 mesh | 0 |
| 4 × 6 mesh | 8 |
| 6 × 8 mesh | 8 |
| 8 × 16 mesh | 20 |
| 16 × 30 mesh | 20 |
| 30 × 50 mesh | 8 |
| 50 × 100 mesh | 6 |
| −100 mesh | 30 |

The magnesite was then divided into four portions and mixed with four different binder systems, the first providing a control sample employing a conventional chromic acid binder system and the other three batched according to the present invention but employing different combinations of sintering aids. The four samples were then subjected to hot crush strength testing at temperatures representative of those which are experienced at temperatures encountered in the heating cycle of a steelmaking furnace. The compositions of the four samples and the test results are shown in Table 3.

TABLE 3

| | Mix 1 (Control) | Mix 2 | Mix 3 | Mix 4 |
|---|---|---|---|---|
| Binder System: | | | | |
| Boric Acid | | 0.5% | 0.5% | 0.5% |
| Sulfamic Acid | | 2.0% | 2.0% | 2.0% |
| Chrome Oxide ($Cr_2O_3$) | | 1.0% | | 0.5% |
| Calcium Nitrate | | | 0.5% | 0.5% |
| Refractory Grain: | | | | |
| Magnesite (98% MgO) | | 96.5% | 97.0% | 96.5% |
| Hot Crush Strength in psi | | | | |
| at 1000° C. | 77 | 440 | 75 | 310 |
| at 1300° C. | 35 | 40 | 20 | 30 |
| at 1400° C. | 20 | 20 | NA | 20 |

All percentages by weight

The reported test results demonstrate that the refractory gunning mixes which employ a binder system based on sulfamic acid are at least the equal of those based on chromic acid.

Industrial Applicability

In view of the chemical stability of solid sulfamic acid, granular solid-phase mixes can be batched using conventional refractory aggregate and stored in bags, drums, bins, silos, or other containers for indefinite periods of time without harmful effects.

Although the invention has been described with regard to certain preferred embodiments it should be understood that such modifications as would be obvious to one having skill in the art may be made without deviating from the scope of the invention which is defined solely by the appended claims.

What is claimed is:

1. A refractory composition comprising a dry granular mixture of a magnesia-based refractory grain and up to about 10% by weight of sulfamic acid as a binder.

2. The composition of claim 1 wherein said refractory grain has an MgO content of from about 50 to about 99.5% by weight.

3. The composition of claim 1 wherein said refractory grain is dead burned magnesite having an MgO content of about 98% by weight.

4. A refractory gunning composition for use in the repair of metallurgical furnace linings comprising a dry granular mixture of magnesia-based refractory grain and between about 0.5 and about 10% by weight of sulfamic acid as a binder.

5. The gunning composition of claim 4 wherein said refractory grain has an MgO content of from about 50 to about 99.5% by weight.

6. The gunning composition of claim 4 wherein said refractory grain is dead burned magnesite having an MgO content of about 98% by weight.

7. the composition of claim 1 or claim 4 wherein said mixture further includes dead burned dolomite, lower grade periclase, and/or chrome ore grog as refractory grain.

8. The composition of claim 1 or claim 4 wherein said mixture also includes up to about 5% by weight boric acid.

9. The composition of claim 1 or claim 4 wherein said mixture also includes up to about 10% by weight of a ceramic sintering aid.

10. A refractory composition comprising a dry granular mixture of a magnesia-based refractory grain and up to about 5% by weight of sulfamic acid as a binder.

11. A refractory gunning composition for use in the repair of metallurgical furnace linings comprising a dry granular mixture of magnesia-based refractory grain and between about 0.5 and about 5% by weight of sulfamic acid as a binder.

12. A dry, granular, refractory gunning mix for use in the repair of metallurgical furnace linings, comprising about 2.0% by weight sulfamic acid, about 0.5% by weight boric acid, from about 0.5 to about 1.0% by weight $Cr_2O_3$, from 0 about to 0.5% by weight $Ca(NO_3)_2$, the balance being magnesia-based refractory grain.

13. The gunning mix of claim 12 wherein said refractory grain has an MgO content of from about 50 to about 99.5% by weight.

14. The gunning mix of claim 12 wherein said refractory grain is dead burned magnesite having a MgO content of about 98% by weight.

* * * * *